US011874756B2

(12) United States Patent
Yang et al.

(10) Patent No.: US 11,874,756 B2
(45) Date of Patent: *Jan. 16, 2024

(54) FEATURE DEPLOYMENT READINESS PREDICTION

(71) Applicant: Microsoft Technology Licensing, LLC, Redmond, WA (US)

(72) Inventors: Connie Qin Yang, Seattle, WA (US); Matthew Scott Rosoff, Seattle, WA (US); Nithin Adapa, Seattle, WA (US); Logan Ringer, Mukilteo, WA (US); Steve Ku Lim, Redmond, WA (US); Xiaoyu Chai, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,712

(22) Filed: Apr. 25, 2022

(65) Prior Publication Data
US 2022/0261331 A1    Aug. 18, 2022

Related U.S. Application Data

(63) Continuation of application No. 16/888,790, filed on May 31, 2020, now Pat. No. 11,341,021.

(51) Int. Cl.
*G06F 11/34*    (2006.01)
*G06F 11/30*    (2006.01)
(Continued)

(52) U.S. Cl.
CPC ........ *G06F 11/3452* (2013.01); *G06F 11/302* (2013.01); *G06F 11/327* (2013.01);
(Continued)

(58) Field of Classification Search
None
See application file for complete search history.

(56) References Cited

U.S. PATENT DOCUMENTS

| 6,073,107 A * | 6/2000 | Minkiewicz ......... G06Q 10/087 705/28 |
| 2007/0226546 A1 * | 9/2007 | Asthana ................ G06F 11/008 714/E11.02 |

(Continued)

OTHER PUBLICATIONS

Caliendo et al., "Some Practical Guidance for the Implementation of Propensity Score Matching," May 2005, IZA, p. 1-29. (Year: 2005).*

*Primary Examiner* — Qing Chen

(57) ABSTRACT

Systems and methods directed to generating a predicted quality metric are provided. Telemetry data may be received from a from a first group of devices executing first software. A quality metric for the first software may be generated based on the first telemetry data. Telemetry data from a second group of devices may be received, where the second group of devices is different from the first group of devices. Covariates impacting the quality metric based on features included in the first telemetry data and the second telemetry data may be identified, and a coarsened exact matching process may be performed utilizing the identified covariates to generate a predicted quality metric for the first software based on the second group of devices.

20 Claims, 14 Drawing Sheets

(51) Int. Cl.
*G06F 11/32* (2006.01)
*G06F 18/243* (2023.01)
(52) U.S. Cl.
CPC ........ *G06F 11/328* (2013.01); *G06F 11/3466* (2013.01); *G06F 18/24323* (2023.01)

(56) References Cited

U.S. PATENT DOCUMENTS

| | | | |
|---|---|---|---|
| 2008/0177686 A1* | 7/2008 | Buyuktosunoglu .. | G05B 13/048 703/2 |
| 2010/0199258 A1* | 8/2010 | Lindley .................. | G06Q 10/06 717/105 |
| 2011/0061041 A1* | 3/2011 | Hellebro .................... | G06F 8/70 717/120 |
| 2012/0209568 A1* | 8/2012 | Arndt .................. | G06F 11/3089 702/183 |
| 2012/0272220 A1* | 10/2012 | Calcagno ............ | G06F 11/3604 717/125 |
| 2016/0188431 A1* | 6/2016 | Chahal ................ | G06F 11/3447 702/182 |
| 2016/0274990 A1* | 9/2016 | Addleman .......... | G06F 11/3409 |

\* cited by examiner

FEATURE DEPLOYMENT READINESS PREDICTION

CROSS-REFERENCE TO RELATED APPLICATIONS

This application is a continuation of U.S. patent application Ser. No. 16/888,790 (now U.S. Pat. No. 11,341,021), filed May 31, 2020, which is incorporated herein by reference.

BACKGROUND

Evaluating pre-release software candidates, such as beta releases, and inferring software quality based on such evaluation is problematic because evaluators assessing the pre-release software candidates tend to be different than the intended audience, also known as the retail audience. That is, the population of individuals evaluating pre-release software candidates is much smaller than the retail audience and those who do evaluate pre-release software candidates tend to use the pre-release software in a manner different from retail users. For example, software evaluators tend to be software enthusiasts and may use the pre-release software less because they are often interested in exploring the new features of the pre-release software or evaluating the pre-release software for adoption purposes. In addition, the hardware used by software enthusiasts tends to be better than the hardware used by the retail audience. Accordingly, determining how best to infer software quality for the larger retail audience based on biased or skewed pre-release software evaluations from a much smaller population of evaluators is challenging and impacts the determination as to when new software may be ready for deployment.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with examples of the present disclosure, methods and systems are provided that are directed to generating a predicted quality metric for a yet to be released version of software based on actual quality metrics from a population or group of software evaluators. That is, a first group of devices may correspond to a limited number of devices used by software evaluators and associated with an preview program, a beta program, or other process that collects quality metrics from devices executing pre-release software or other software not yet available for retail use or public use. The quality metric for the software associated with the first group of devices may be indicative of how well the pre-release version, or pre-release build, of the software executes, or functions, on the first group of devices. Systems and methods described herein utilize similarities and differences between the first group of devices and users and the second group of devices and users to predict a quality metric for software, where the predicted quality metric is a prediction of how well the pre-release version of software is expected to function on the second group of devices and users. Accordingly, the predicted quality metric may provide insights into when a feature, update, or otherwise may be ready for deployment.

In accordance with examples of the present disclosure, a method for generating a predicted quality metric is provided. The method may include receiving first telemetry data from a first group of devices executing first software, generating a quality metric for the first software based on the first telemetry data, receiving second telemetry data from a second group of devices, wherein the second group of devices is different from the first group of devices, identifying covariates impacting the quality metric based on features included in the first telemetry data and the second telemetry data, and performing coarsened exact matching utilizing the identified covariates to generate a predicted quality metric for the first software on the second group of devices.

In accordance with examples of the present disclosure, a computer-readable media is provided. The computer-readable media may include instructions, which when executed by a processor, causes the processor to: receive first telemetry data from a first group of devices executing first software, generate a quality metric for the first software based on the first telemetry data, receive second telemetry data from a second group of devices, wherein the second group of devices is different than the first group of devices, identify covariates impacting the quality metric based on features included in the first telemetry data and the second telemetry data, perform coarsened exact matching utilizing the identified covariates, identify weights to be assigned to each device in the first group of devices, and generate a predicted quality metric based on the weights assigned to each device in the first group of devices and the identified covariates.

In accordance with examples of the present disclosure, a system for generating a predicted quality metric is provided. The system may include a processor, and memory storing instructions, which when executed by the processor, cause the processor to: receive first telemetry data from each device in a first group of devices executing first software, generate a quality metric for the first software based on the first telemetry data, receive second telemetry data from a second group of devices, wherein the second group of devices is different than the first group of devices, identify covariates impacting the quality metric based on features included in the first telemetry data and the second telemetry data, stratify the first and second group of devices based on the identified covariates, reweight each device in the first group of devices, and generate a predicted quality metric based on the weights assigned to each device in the first group of devices and the identified covariates.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
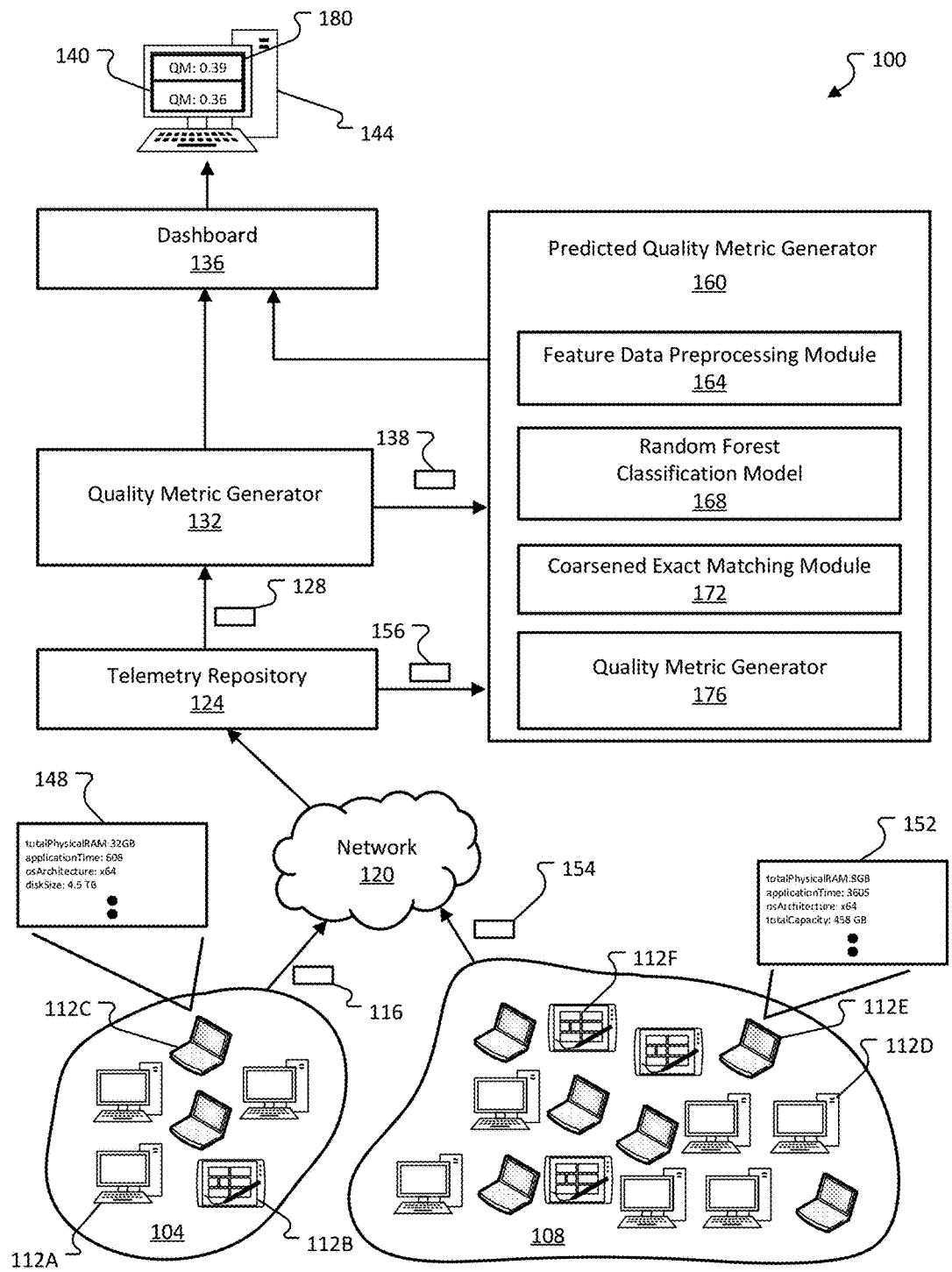
FIG. 1 details of a predicted quality metric generation system in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The software development life cycle (SDLC) is an established and standard framework or approach, used in carrying out the development of a software product, in multiple stages. The ultimate goal behind the development of a software product is to release and deliver the software product to its intended or targeted users or the client. Though a software development team may modify one or more steps of the SDLC, the SDLC often includes requirements analysis, planning, software design, software development, software testing, and then deployment and maintenance. Similar to the software development life cycle, a software release life cycle exists to ensure the timely release of a software application from its coding to final release. The software release cycle ranges from the initial development of the software to its eventual release and includes updated versions to improve the software or fix software bugs found through development and testing. The basic purpose of defining a software release cycle is to assess the stability of a software product under development and to further develop the product for the next subsequent stage, until it finally releases. The software release cycle is often described using different terms and stages but often includes many pre-release stages followed by a release to market or release to web stage.

The software release cycle may begin with an initial release of the software to internal users of the software developing organization. This stage is often referred to as an alpha stage release. The alpha stage may refer to the testing performed on the initial software product after its initial development. During the alpha stage, the software may be tested internally by developers and testers within an organization and may be used by various users within the organization with an understanding that the alpha software may not be stable and will often times require additional development prior to mainstream deployment. Alpha software may contain serious errors, and any resulting instability could cause crashes or data loss. Alpha software may not contain all of the features that are planned for the final version.

After the software is released to internal users of the developing organization, the software may be released to a select group of users for testing by intended users in a real environment. This phase is often referred to as a preview phase, a technical preview phase, or as a beta phase and the software may be identified as an preview build. Software in the preview phase is often seen as the last testing phase before the product is released to the market. The preview build may generally have many more bugs in it than completed software, speed or performance issues, and may still cause crashes or data loss. The focus of testing in the preview phase is to reduce impacts to end users, often incorporating usability testing. The process of delivering the preview build to the users is called preview release, or beta release, and is typically the first time that the software is available outside of the group or organization that developed it. There may be many preview releases, also referred to as different preview builds or different preview versions as new features are added, usability is enhanced, and bugs are found and fixed. Such releases may be public or private, depending on whether they are openly available or available only to a limited audience. The preview build is often useful for demonstrations and previews within an organization and to prospective customers. Other terms referring to this phase may include, but are not limited to, preview, prototype, technology preview, early access, or release candidate, where a release candidate is often seen as the final product to be released unless serious issues or defects arise.

Following the release candidate, the software product may be released to the client or otherwise be made available to the end user. Often referred to as the release to retail phase, release to manufacturing phase, or release to web phase, the latest build, often referred to as the retail build, may be digitally signed, allowing the end user to verify the integrity and authenticity of the software purchase. A copy of the retail build may be sent for duplication and mass distribution and/or distributed over the web.

Throughout each phase of the software release cycle, each build, or version, of the software may include various features or additions; the software and the new features can be monitored for bugs, crashes, performance, and other interruptions impacting user satisfaction. Software is better if it fails less often, and easily recovers from failure when it happens. Metrics may be used to track and assess the reliability of the software as well as the new features that may have been added; such metrics may include, but are not limited to an average failure rate—the average number of failures per period per deployed unit or user of the software, a mean time between failure/mean time to failure—the measurement of the amount of time the software is expected to work correctly until the next major failure, a number of crashes, etc. In addition, software performance may be evaluated to understand the level of performance by users and how performance impacts the user's use of the software. Metrics to track and monitor performance may include CPU usage, error rates, response times, garbage collection, request rates, and overall customer satisfaction. In some examples, a quality metric may be the same as a quality measure.

However, many of the metrics relied upon to track and assess software reliability and performance may be impacted by other factors. For example, the hardware on which the software is executed, such as but not limited to the CPU, a physical amount of system memory, an available amount of storage, a system architecture, etc., may impact processing speeds, an amount of memory available to the software, and an overall user experience. Software running on the latest and greatest hardware may have access to hardware resources that allow the most complicated calculations to be performed in a small amount of time, whereas the same software running on an older system with fewer resources may take longer to execute the same calculations and cause the application to perform slow and even fail. In some instances, other software and/or other features added to the software running on the system may contribute to reliability and performance issues.

In addition, the metrics relied upon to track and assess software reliability and performance may be impacted by the frequency and manner in which users interact with the software and/or various features of the software. That is, a user may interact with software in a manner that is different from other users. As an example, a first user may extensively use a few features of the software whereas a second user may casually use all features of the software. Therefore, quality measurements associated with the software reliability and performance as provided via the first user may be different from the quality measurements associated with software reliability and performance via the second user.

While software quality metrics obtained from the pre-release phases or otherwise based on the preview build may be used to infer quality of the software and/or features for the yet-to-be released general release or retail build, actual measures of software quality from the preview build in the pre-release phases may not match measures of software quality later obtained when the software and/or new features of the retail build are actually released to the general population of users and used by the intended audience. That is, due in part to the differences in hardware and software use, the software quality metrics obtained based on the preview build in the pre-release phases are representative of quality as experience by a smaller, select, population of users (e.g., the preview audience or group). For example, a measurement of the mean time between failure metric may be within an acceptable range for the preview build during the pre-release phases; however, a measurement of the same mean time between failure metric may be different for the retail build when the software is actually released. As another example, a new feature may be added to software that may operate or function extremely well in one environment or for a certain population of users, but may fail or otherwise decrease user satisfaction for a different population of users. Thus, the preview population evaluating the preview build may skew or add a bias to the quality metrics that are used to infer a measurement of quality for the retail build.

To overcome the skew or bias added to the quality metrics by the preview population in the pre-release phase and infer software quality for a later release (e.g., retail build), similarities and differences between the two populations, or groups, of users and/or devices can be determined. That is, the similarities and differences between a first population, or group, of users and devices executing the preview build (e.g., preview audience) and a second population, or group, of users and devices that will be executing the retail build (e.g., retail audience) may be used to better predict, or better infer, the software quality metric or measurement for the retail build when released. Through the use of a causal inference matching process, such as coarsened exact matching, the quality metric associated with each device in the preview population may be reweighted based on the retail population such that the preview population better reflects the retail population and a predicted quality metric based on the reweighted quality metrics of the preview population more closely matches the actual quality metric derived from the retail population.

To do so, a quality metric associated with an aspect of the software and/or feature must first be identified. As an example, software developers, scientists, and engineers may determine that a mean time to failure (MTTF) metric associated with a service, software application, or feature executing on a device may provide a measure of software quality for that particular same service, software application, or feature executing on a device. For example, an MTTF measurement for a display manager service may provide a measure of software quality for the display manager service. Alternatively, or in addition, software developers, scientists, and engineers may determine that a mean time to failure (MTTF) metric associated with a service, software application, or feature executing on a device may provide a measure of software quality for a different service, software application, or feature executing on the device. For example, an MTTF measurement for a display manager service may provide a measure of software quality for a printer application, where the printer application may rely on the display manager service to display content to a user. The selected quality metric may be obtained as a standalone average (e.g., average MTTF for a service, software application, or feature across all preview devices).

Upon identifying a quality metric, one or more covariates associated with the quality metric may be identified. That is, one or more characteristics or features may be identified that affect the identified quality metric. For example, a covariate of the MTTF for a display service may include, but is not limited to, a measure of an amount of the total physical RAM for a device (totalPhysicalRAM), an amount of time since the operating system was last rebooted (osTime), a region of the world the user/device is located in, a firmware manufacturer for the device, a system architecture (osArchitecture) (e.g., x32 vs. x64), a processor manufacturer (processorManufacturer), etc. Such covariates may be a subset of a features list. The features list may include those features that describe a device or user and are available as device and software diagnostic information for the two populations, or groups, of devices.

The device and software diagnostic information may be provided by a software telemetry service associated with each device, where the software diagnostic information may be provided in real-time or near real-time for devices associated with the preview build. The software and diagnostic information provided by the devices in the retail population may be historical in nature and may correspond to software and diagnostic information gathered via a release build that is previous to the preview build. For example, if the preview build corresponds to a second version of the software, the software and diagnostic information provided by the devices of the retail population may be associated with the first version of the software.

The covariates may be identified from a subgroup of features on the feature list. For example, software developers, scientists, and engineers may identify thirty features (e.g., a subgroup of features from the feature list) that generally influence the identified quality metric. Based on the feature list and/or the subgroup of features from the feature list, the covariates may be identified using a machine learning model.

A machine learning model that provides an indication of the relative importance or contribution of each feature to a prediction outcome may be used to identify the important covariates. For example a random forest classifier may be used to identify covariates affecting the quality metric. The random forest classifier may be trained with the features from the features list or the subset of features from the subgroup of features from the features list that were identified by the software developers, scientists, and engineers as influencing the identified quality metric. The random forest classifier, once trained with such features, may act as a feature selector, providing an indication of the relative importance or contribution of each feature to a prediction. For example, the random forest classifier may provide a relevance score for each feature input during the training of the random classifier model, where the relevance score can be used to select the important features and drop the least important ones. That is, the top ten most important features may be selected as the covariates; alternatively, or in addition, the important features having a relevance score above a threshold may be selected as the covariates.

Once the covariates (e.g., subset of features from the features list or a subset of features from the subgroup of features from the features list) have been identified, each covariate may be assessed to determine whether an imbalance, or difference, exists between the preview population and the retail population. Data for each identified feature that is a covariate may be coarsened or stratified into smaller, more defined groups, or buckets, based on a predetermined set of criteria, where the predetermined set of criteria may correspond to a distribution, such as a Gaussian distribution and a number of strata, or buckets. The covariates that exhibit imbalance may be selected and utilized in the coarsened exact matching process.

The coarsened exact matching process may be used to reweight the quality metric associated with each device in the preview population based on the retail population. As will be described below, a weighting for each strata, or bucket, may be determined based on the number of devices of the preview population and of the retail population that fall within each strata, or bucket. The weighting may be applied to the quality metric of preview population such that an average mean of the quality metric better predicts the quality metric associated with the retail population.

FIG. 1 depicts details of a predicted quality metric generation system 100 in accordance with examples of the present disclosure. The predicted quality metric generation system 100 may utilize an existing quality metric for software associated with a first group of devices 104 and predict a quality metric for the software associated with the second group of devices 108, where the second group of devices 108 may include more devices than the first group of devices 104. That is, a first group of devices 104 may be a limited number of devices associated with an preview program, beta program, or devices executing pre-release software or other software not yet available for retail use. The quality metric for the software associated with the first group of devices 104 may be indicative of how well the pre-release version of the software, or preview build, executes, or functions, on the devices 112A-112C of the first group of devices 104. In some instances, the quality metric may be indicative of a quality measurement inferred by a user, such as measurements associated with user usage and/or user feedback. As the number of devices in the first group of devices 104 may be different from and less than the number of devices in the second group of devices 108 and/or may be used in a different manner from the devices in the second group of devices 108, the predicted quality metric generation system 100 may generate a predicted quality metric indicating how well the pre-release, or preview build, version of the software would execute, or otherwise function, across the number of devices in the second group of devices 108. Stated another way, the predicted quality metric generation system 100 utilizes similarities and differences between the first group of devices 104 and the second group of devices 108 to predict a quality metric for software expected to be executed at the second group of devices 108.

As depicted in FIG. 1, the devices 112A-F may include, but are not limited to, desktops 112A/112D, tablets 112B/112E, and/or a laptops 112C/112F. The software executing on first group of devices 104 may include, but is not limited to, an operating system, an application, a service, or other instructions executed by a processor of the devices within the group of devices 104. The quality metric may be identified or selected from software developers, engineers, and scientists as a best measure of quality associated with a specific functionality of the device 112A-112C, software executing on the devices 112A-112C, and/or a service executing on the devices. For example, a quality metric may be equal to a mean time to failure (MTTF) for a service, such as a print spooler, install service, or window manager. As one non-limiting example, the quality metric may be equal to a MTTF for a service or executable associated with graphics rendering. As another non-liming example, the quality metric may be equal to a number of crashes associated with a print function for a word processing application, where such quality metric may be used to indicate a quality associated with an update to the operating system or other application. While MTTF is discussed as a quality metric, other quality metrics may be used including average failure rate, number of crashes, average disconnection rate, number of hardware and/or software events of a specific event ID.

Similarities and differences between the first group of devices 104 and the second group of devices 108 may be obtained via feature data from telemetry streams 116 and 154. As used herein "telemetry data" includes, but is not limited to, information about the device and how it's configured (including hardware attributes such as CPU, installed memory, and storage), as well as quality-related information such as uptime and sleep details and the number of crashes or hangs. That is, each device 112A-112C of the first group of devices 104 may provide device and software diagnostic feature data 148 as a telemetry stream 116. The device and software diagnostic feature data may include, but is not limited to, a number of crashes associated with the hardware/software, a total amount of physical RAM (totalPhysicalRAM), an amount of time since the last operating system reboot (osTime), an architecture of the operating system (osArchitecture), an amount of disk space (diskSpace), usage of the CPU (cpuUsage), a number of CPU cores (processorCores), a manufacturer of the CPU (processorManufacturer), a type of hardware being used, applications installed and usage details, reliability information on device drivers, and may be provided as a telemetry stream 116 to a telemetry repository 124 via the network 120. Similarly, each device 112D-112F of the second group of devices 108 may provide device and software diagnostic feature data 152 as a telemetry stream 154. The device and software diagnostic feature data may include, but is not limited to, a number of crashes associated with hardware/software, a total amount of physical RAM (totalPhysicalRAM), an amount of time since the last operating system reboot (osTime), an architecture of the operating system (osArchitecture), an amount of disk space (diskSpace), usage of the CPU (cpuUsage), a number of CPU cores (processorCores), a manufacturer of the CPU (processorManufacturer), a type of hardware being used, applications installed and usage details, reliability information on device drivers, and may be provided in a telemetry stream 154 to the telemetry repository 124 via the network 120. In aspects, the device and software diagnostic feature data 152 is associated with a retail release, or a version of software that is previous to the version of software executed on the devices in the first group of devices 104. For example, the device and software diagnostic feature data 152 may be collected from devices executing a stable release, or retail version, of an operating system or operating system update, such as an operating system version 4.3, whereas the device and software diagnostic feature data 148 may be collected from devices executing an preview build, or yet to be released version of an operating system or operating system update, such as an operating system version release candidate 4.4. In aspects where a previous version does not exist, the telemetry data 154 may be obtained from other sources, such as inferred from similar software operating systems or software applications.

The telemetry repository 124 may provide feature data 128 to the quality metric generator 132. The quality metric generator may generate a quality metric based on the feature data 128, where the quality metric may be an average of the feature data 128 obtained from feature data each of the devices in the first group of devices 104. The quality metric may be a metric that is tracked and assessed by engineering teams for their performance in the preview builds to make determinations about whether a new software product is ready to be released to the public (e.g., "ship no ship" determinations). As one non-limiting example, the quality metric generator may generate the MTTF quality metric based on the number of times a service associated with graphics rendering exhibited a failure or fault as measured with respect to an amount of time since the last reboot of the operating system. The quality metric may represent a mean, or average, MTTF across all devices within the first group of devices 104. The quality metric generator 132 may then provide the quality metric to a dashboard 136 such that a client device 144 may display the resulting quality metric 140, where the quality metric 140 represents a quality metric associated with a specific pre-release version of software executed on a first group of devices 104.

The telemetry repository 124 may provide feature data 156 to the predicted quality metric generator 160. The feature data 156 may be determined by software developers, scientists, and engineers and selected from the features provided in the telemetry stream 154 (from the second group of devices) and telemetry stream 116 (from the first group of devices). The predicted quality metric generator 160 may include a feature data preprocessing module 164, a random forest classification model 168, a coarsened exact matching module 172, and a quality metric generator 176. The feature data preprocessing module may process the feature data 156 and convert the feature data 156 into a usable format to train the random forest classification model 168. The random forest classification model 168 may be trained on the preprocessed feature data provided from the feature data preprocessing module 164 and may identify one or more features as an important covariate. For example, the random forest classification model 168 may score features representing covariates that impact the quality metric; each covariate feature score may provide an indication of an impact of the feature to the quality metric. Each of the covariate features having a score above a threshold for example, may be selected as the covariate features impacting the quality metric.

In some aspects, a subset of the identified covariates having a high impact on the quality metric may be selected based on feature imbalance. In aspects, feature imbalance refers to the differences that exist between the first group of devices 104 and the second group of devices 108. As part of the imbalance identification process, covariate features may be coarsened or stratified into smaller, more defined groups, or buckets, based on a predetermined set of criteria, where the predetermined set of criteria may correspond to a distribution, such as a Gaussian distribution and a number of strata, or buckets. The covariate features that exhibit imbalance may be selected and utilized in the coarsened exact matching process performed by the coarsened exact matching module 172.

Coarsened exact matching is a causal inference technique to non-parametrically create a matched dataset to evaluate the effect of a treatment on a control population. In accordance with examples of the present disclosure, the feature data associated with the second group of devices 108 may be considered the control population while the feature data associated with the first group of devices 104 may be considered the treatment population. Accordingly, the effect of the preview build for example, on the devices executing the retail build in the second group of devices 108, may be assessed utilizing the coarsened exact matching module 172.

As will be further discussed below, an output of the coarsened exact matching module 172 may include feature weights that are to be applied to the quality metric generation process implemented by the quality metric generator 132, for example. Accordingly, the quality metric generation process utilized to create the quality metric at 132 may be provided to the predicted quality metric generator 160 as the preview build quality metric generation process 138. The quality metric generation process 138 may be an equation or algorithm associated with the generation of the quality metric for the preview build. The feature weights determined by the coarsened exact matching module 172 may be applied to the quality metric generation process 138 and a quality metric associated with the second group of devices 108 may be generated. The quality metric associated with the second group of devices 108 may then be provided to the dashboard 136 such that the client device 144 may display the resulting quality metric 180, where the quality metric 180 represents the quality metric associated with a predicted execution of preview build as executed by the second group of devices 108.

Figure 2:
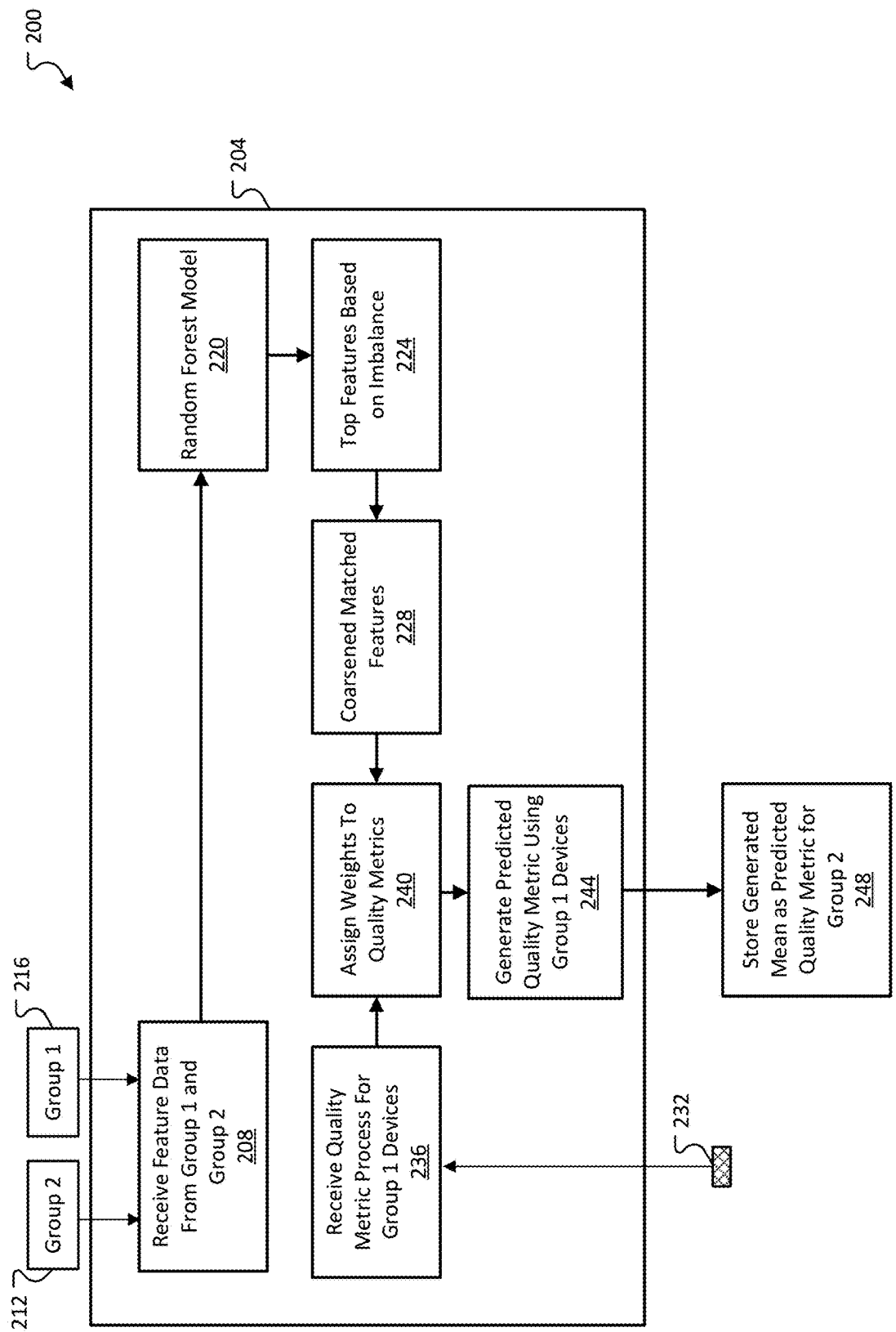
FIG. 2 depicts additional details of a predicted quality metric generation system in accordance with examples of the present disclosure.

FIG. 2 depicts additional details of a predicted quality metric generation system 200 in accordance with examples of the present disclosure. The predicted quality metric generation system 200 may be the same as or similar to the predicted quality metric generation system 100 previously discussed. Accordingly, a predicted quality metric generator 204, which may be the same as or similar the predicted quality metric generator 160, may receive feature data 212 from the telemetry stream 116 provided via the first group of devices 104 and feature data 216 from the telemetry stream 154 provided via the second group of devices 108 at 208. Whereas telemetry stream data may include, but is not limited to, information about the devices and how the devices are configured (including hardware attributes such as CPU, installed memory, and storage), as well as quality-related information such as uptime and sleep details and the number of crashes or hangs, the feature data 212 may be a subset of the feature data provided from the telemetry data 116 and may be based on a specific quality metric. For example, the feature data 212 may include fifty features determined to be relevant to a quality metric equal to a printer install failure rate. Such features may include, but are not limited to, a total amount of physical RAM (totalPhysicalRAM), an amount of time since the last operating system reboot (osTime), an architecture of the operating system (osArchitecture), an amount of disk space (diskSpace), usage of the CPU (cpuUsage), a number of CPU cores (processorCores), a manufacture of the CPU (processorManufacturer), and whether another printer is installed, for example. Similarly, the feature data 216 may be a subset of the feature data provided from the telemetry stream data 154 and may be based on the same specific quality metric. For example, the feature data 216 may include the same fifty features determined to be relevant to the quality metric equal to the printer install failure rate. Such features may include, but are not limited to, a total amount of physical RAM (totalPhysicalRAM), an amount of time since the last operating system reboot (osTime), an architecture of the operating system (osArchitecture), an amount of disk space (diskSpace), usage of the CPU (cpuUsage), a number of CPU cores (processorCores), a manufacture of the CPU (processorManufacturer), and whether another printer is installed, for example.

The feature data 212 and 216 may be preprocessed into a format for training a random forest model 220. A portion of the preprocessed feature data 212 and 216 may be utilized to train the random forest model 220 and identify features representing covariates having a high impact on the quality metric. For example, the random forest model 220 may score features representing covariates impacting the quality metric; each feature score may indicate the impact of the feature on the quality metric. Each of the features having a score above a threshold for example, may be selected as the features having a high impact on the quality metric. Accordingly, at 220, a subset of the original fifty features may be selected as the features having a high impact on the quality metric of the printer install failure rate.

Further, at 224, a portion of the subset of the original fifty features selected as the features having a high impact on the quality metric of the printer install failure rate may be selected based on feature imbalance. As previously discussed, feature imbalance may be assessed in a manner such that features having a high impact on the quality metric and representing imbalance between the first group of devices 104 and the second group of devices 108 are utilized in a coarsened exact matching process. In some examples, a comparison of each feature's distribution from the first group of devices 104 may be made with each of the corresponding feature's distribution from the second group of devices 104. Those features showing feature imbalance as assessed by the feature's distribution may be selected for coarsened exact matching. That is, where a difference between the feature's distribution from the first group of devices 104 and the feature's distribution from the second group of devices 108 meets or exceeds an imbalance threshold, the feature may be selected as a bin or bucket in the exact coarsened matching process as further described below. At 228, the features having a high impact on the quality metric and representing imbalance between the first group of devices 104 and the second group of devices 108 are utilized in the coarsened exact matching processes to generate weightings to be applied in the coarsened matched features associated with the first group of devices 104.

Figure 3:
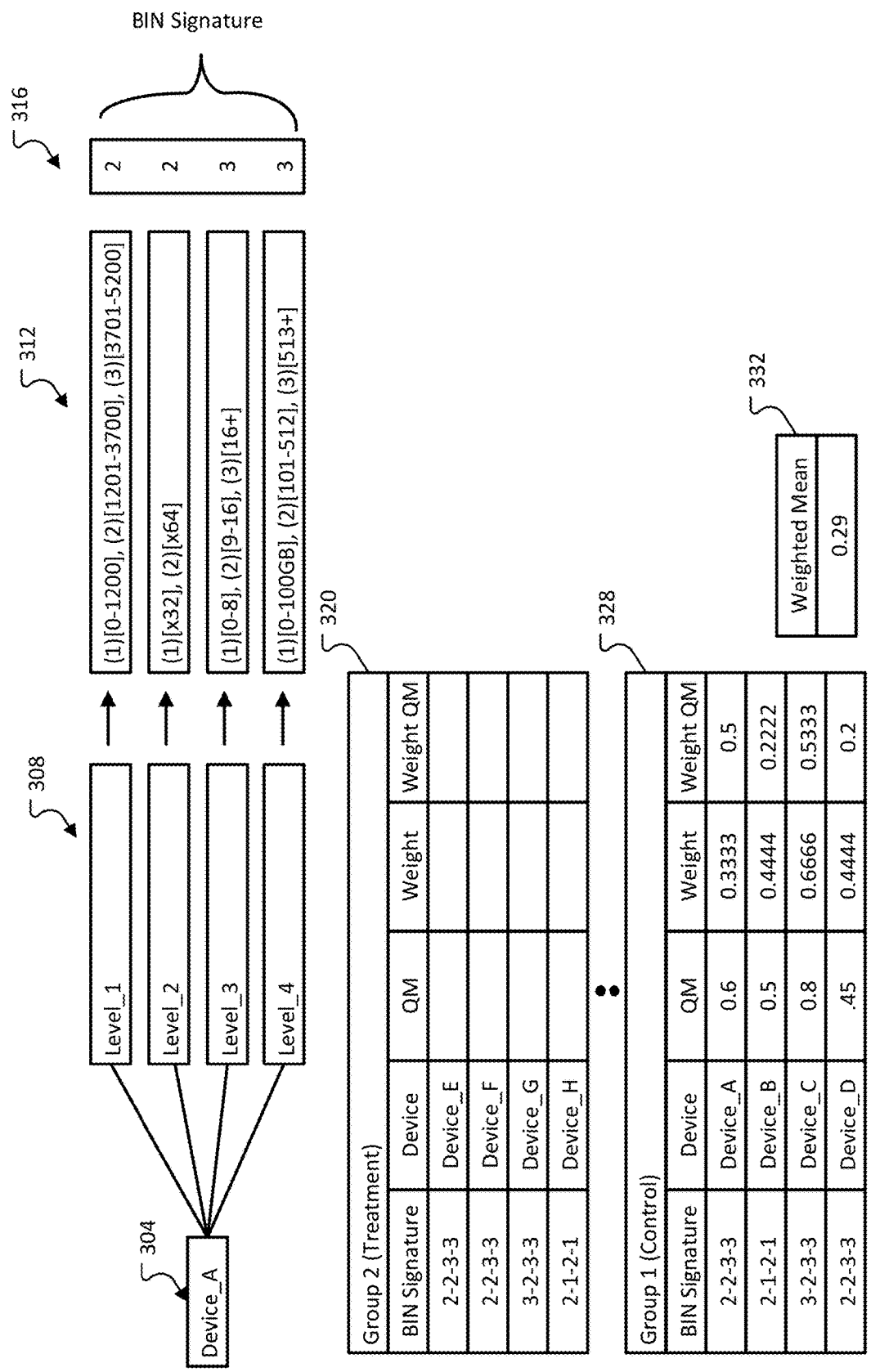
FIG. 3 depicts details of a coarsened exact matching process in accordance with examples of the present disclosure.

For example, turning to FIG. 3, a coarsened exact matching process is described in accordance with examples of the present disclosure. Features 308 may represent features having a high impact on the quality metric and representing imbalance between the first group of devices 104 and the second group of devices 108 as previously described. Each device 304 in the first and second groups of devices 104 and 108, may be represented by features coarsened to discrete values using a coarsening or binning strategy, such as the coarsening or binning strategy depicted as 312. Thus, for each device 304, a "BIN Signature" 316 may be used to exactly match other devices 304, with the same "BIN Signature" 316. Each matched device 304 must have the exact same BIN signature 316 as their matched device in the other group. For example, a device 304 in the second group of devices 108 with feature data equal to Level 1, Level 2, Level 3, Level 4, and Level 5, can only match a device in the first group of devices 104 having the exact same values for the feature data of Level 1, Level 2, Level 3, Level 4, and Level 5. With features and binning strategies chosen, a BIN signature 316 is generated for each device 304 in the second group of devices 108 and is matched with devices 304 in the first group of devices 104. A percentage of second group of devices 108 will be matched, but not necessarily all, as a device 304 belonging to the second group of devices 108 may have a BIN signature that no device 304 of the first group of devices 104 has and vice versa. An imbalance between the number of devices 304 in the second group of devices 108 and the number of devices 304 in the first group of devices 104 with a same BIN Signature may exist. Such a variance in distribution may be normalized using coarsened exact matching weights, where the weight may be calculated according to Equation 1.

$$Weight_{BIN\ Signature} = \frac{\frac{Number\_of\_BIN\_Matched\_Group\_2\_devices}{Number\_of\_BIN\_Matched\_Group\_1\_devices}}{\frac{Number\_of\_Group\_1\_devices}{Number\_of\_Group\_2\_devices}} \qquad \text{Equation 1}$$

As each weight for each BIN signature may be calculated according to equation 1, the weight may be applied to the first group of devices 104 as depicted in Table 328 of FIG. 3. Although a simplistic representation of the quality metric generation process is depicted in FIG. 3, a quality metric corresponding to a weighted mean may be generated. For example, returning to FIG. 2, the quality metric generation process 232 for the first group of devices 104, which may be the same as or similar to the quality metric generation process 138, may be received at 236. In some examples, the quality metric generating process 232 may include device specific quality metric for devices in the first group 104. The weights, as calculated by the coarsened exact matching process may be applied to the quality metrics such that each device's contribution belonging to the first group of devices 104 to predict a quality metric at 244. That is, the predicted quality metric 244 may be a weighted mean of weighted quality metric specific to each device in the first group of devices 104. The generated predicted quality metric based on the first group of devices 104, the weights provided by the coarsened exact matching process, and the quality metric process utilized to generate the quality metric for the first group of devices 104, may then be stored as the predicted quality metric for the second group of devices 108 at 248.

Figure 4:
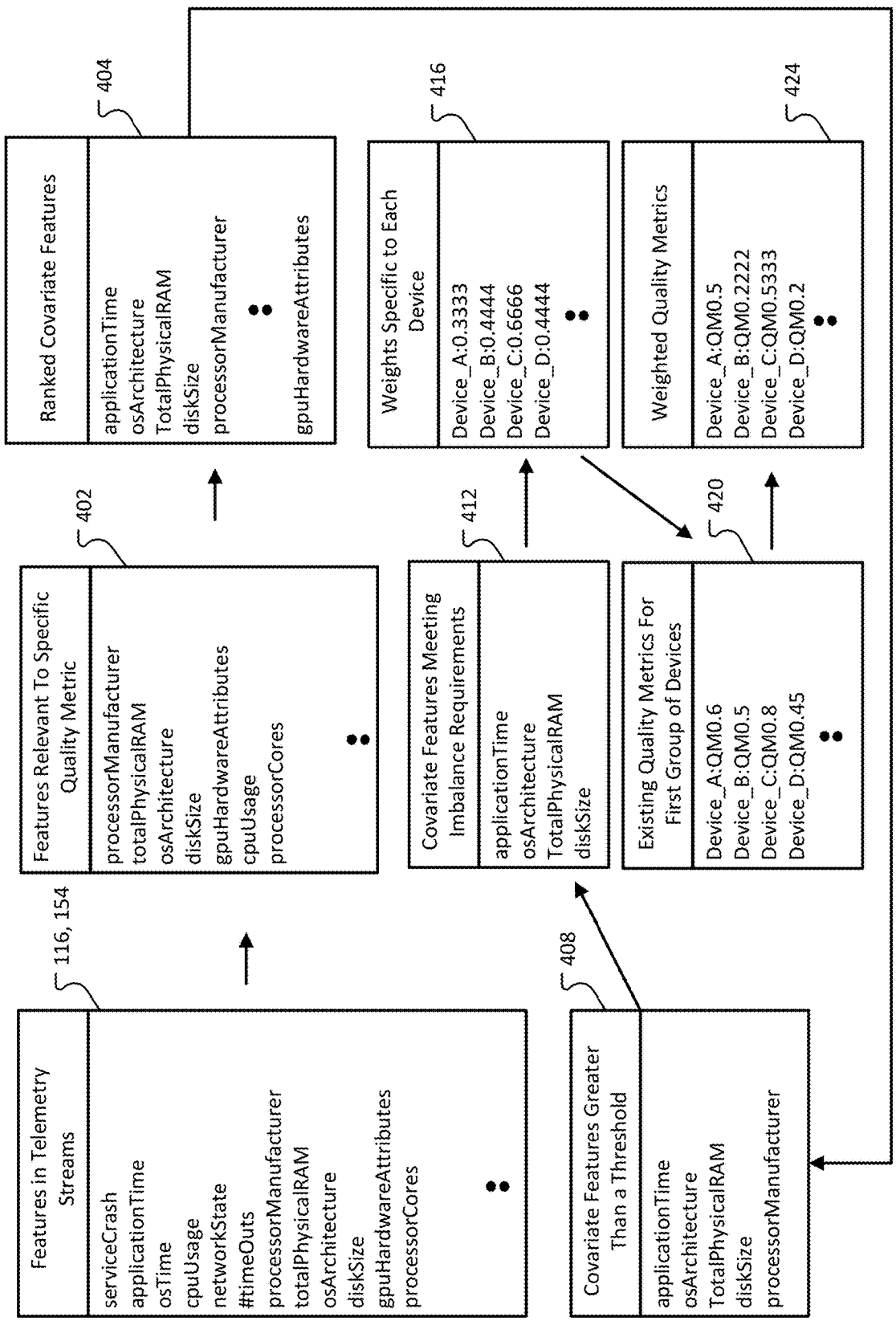
FIG. 4 depicts example software diagnostic feature data utilized throughout the predicted quality metric process in accordance with examples of the present disclosure.

FIG. 4 depicts example features utilized throughout the predicted quality metric process in accordance with examples of the present disclosure. For example, the telemetry streams 116 and 154 may include feature data 148, 152 provided from each device of the first and second groups of devices 104 and 108. Example feature data may include, but is not limited to serviceCrash, applicationTime, osTime, cpuUsage, networkState, #timeOuts, gpuHardwareAttributes, processorManufacturer, totalPhysicalRAM, osArchitecture, diskSize, processorCores, etc. Additional feature data may be included as indicated by the ellipses. The features 402 may represent features determined to be relevant by software developers, engineers, and scientists for generating a specific quality metric. For example, the features 402 may represent fifty features that software developers, engineers, and scientists determined to be relevant for generating a quality metric equal to MTTF of a specific process or services, such as a display manager. Covariate features ranked by relative importance or contribution to a prediction based on a trained random forest classification model are depicted as ranked covariate features 404. As depicted in the ranked covariate features 404, the feature "gpuHardwareAttributes" may not have a large impact on the quality metric and as such is ranked at the bottom. Further, each of the ranked covariate features having a score above a threshold for example, may be selected as the features having a high impact on the quality metric, and therefore may selected for coarsened exact matching, as indicated selected covariate features 408. In some examples, an imbalance between the feature data of the first group of devices 104 and the feature data for the second group of devices 108 may be utilized to ensure that the features chosen for coarsen exact matching are sufficiently dissimilar between device groups.

Figure 5:
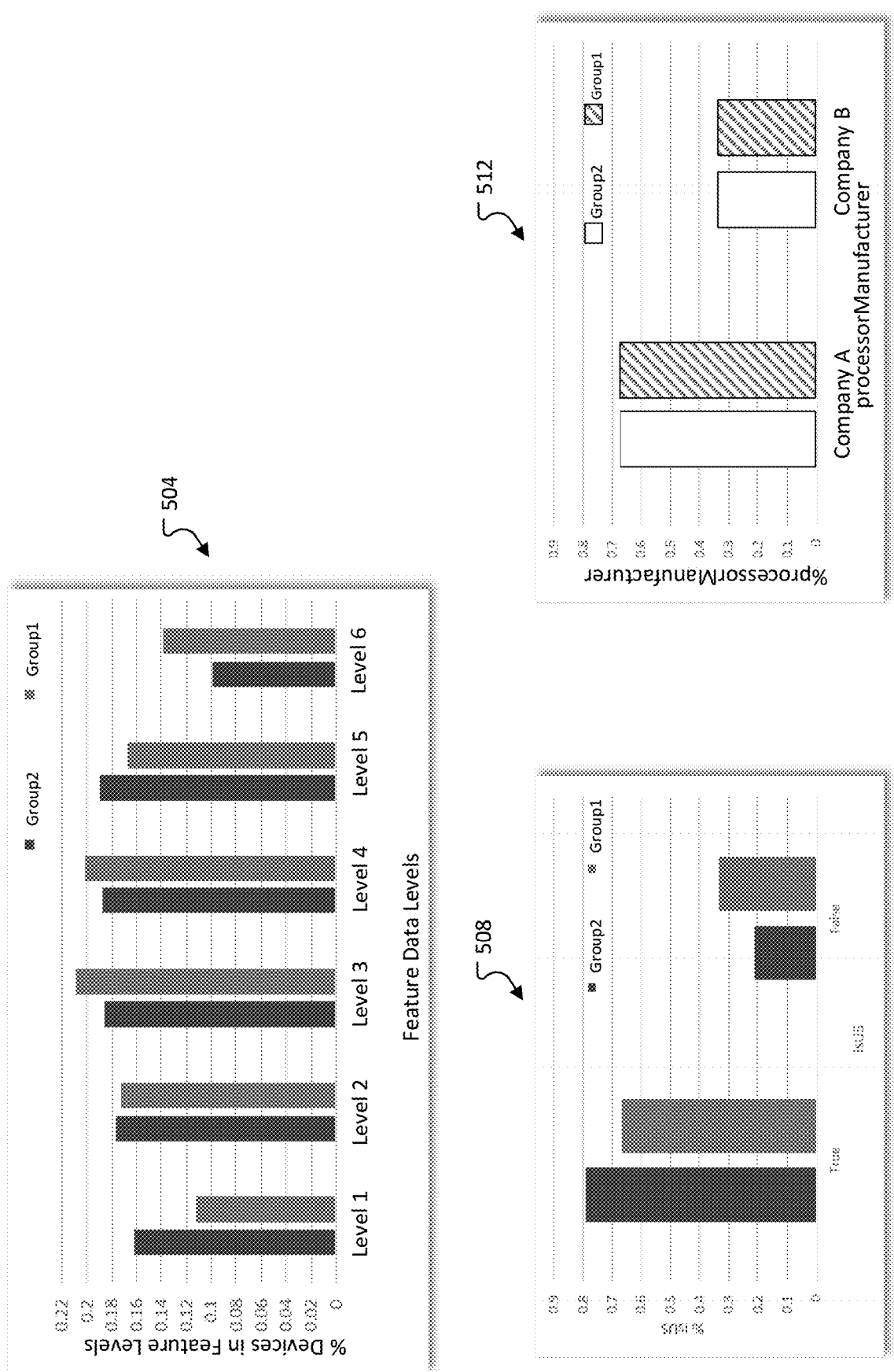
FIG. 5 depicts examples of balanced and imbalanced features resulting from the random forest classifier in accordance with examples of the present disclosure.

For example, turning to FIG. 5, a distribution of devices dispersed in each feature level is shown as depicted in graph 504. The feature depicted in graph 504 may be any of the previously discussed features and the feature levels may be associated with a binning or bucketing of the data associated with feature into one or more categories as shown (e.g., Level 1, Level 2, etc.). As depicted in the graph 504, the distribution of the devices in the feature levels is different between the devices of the first and second groups 104 and 108; accordingly, such feature would be considered to be imbalanced. For example, around 16% of the Group 2 devices can be categorized in the Level 1 category whereas about 11% of the Group 1 devices can be categorized in the Level 1 category. The additional levels depicted in the graph 504 show similar differences between Group 1 and Group 2 devices. Therefore, the feature represented in the graph 504 may be utilized in the coarsened exact matching process. Similarly, a more specific feature, such as a region feature, may be shown as depicted in graph 508. As the differences in the distribution of the region between devices of the first and second groups 104 and 108 are shown to be imbalanced, the region feature may be utilized in the coarsened exact matching process. However, a distribution of the processorManufacturer feature may be depicted in graph 512. As the differences in the distribution of the processorManufacturer between devices of the first and second groups 104 and 108 are not shown to be imbalanced, the processorManufacturer feature should not be utilized in the coarsened exact matching process.

Returning to FIG. 4, the features 412 may meet imbalance requirements and represent the four features out of the original fifty features to be used in the coarsened exact matching process. The data 416 depicts the generation of the weights for various BIN Signatures utilizing the features 412. For example, an individual device, such as Device_A, having a build, revision, or other software, may be assigned a weight from the coarsened exact matching process of 0.3333. The weights may be applied to existing quality metrics (QM) 420 at the device level for each device of the first group of devices 104, to obtain a weighted quality metric 424 for each device, as previously discussed with respect to FIG. 3. In accordance with at least one example, a mean of all weighted quality metrics (QM) may be generated, where the weighted mean represents a predicted quality metric for the second group of devices 108.

Figure 6A:
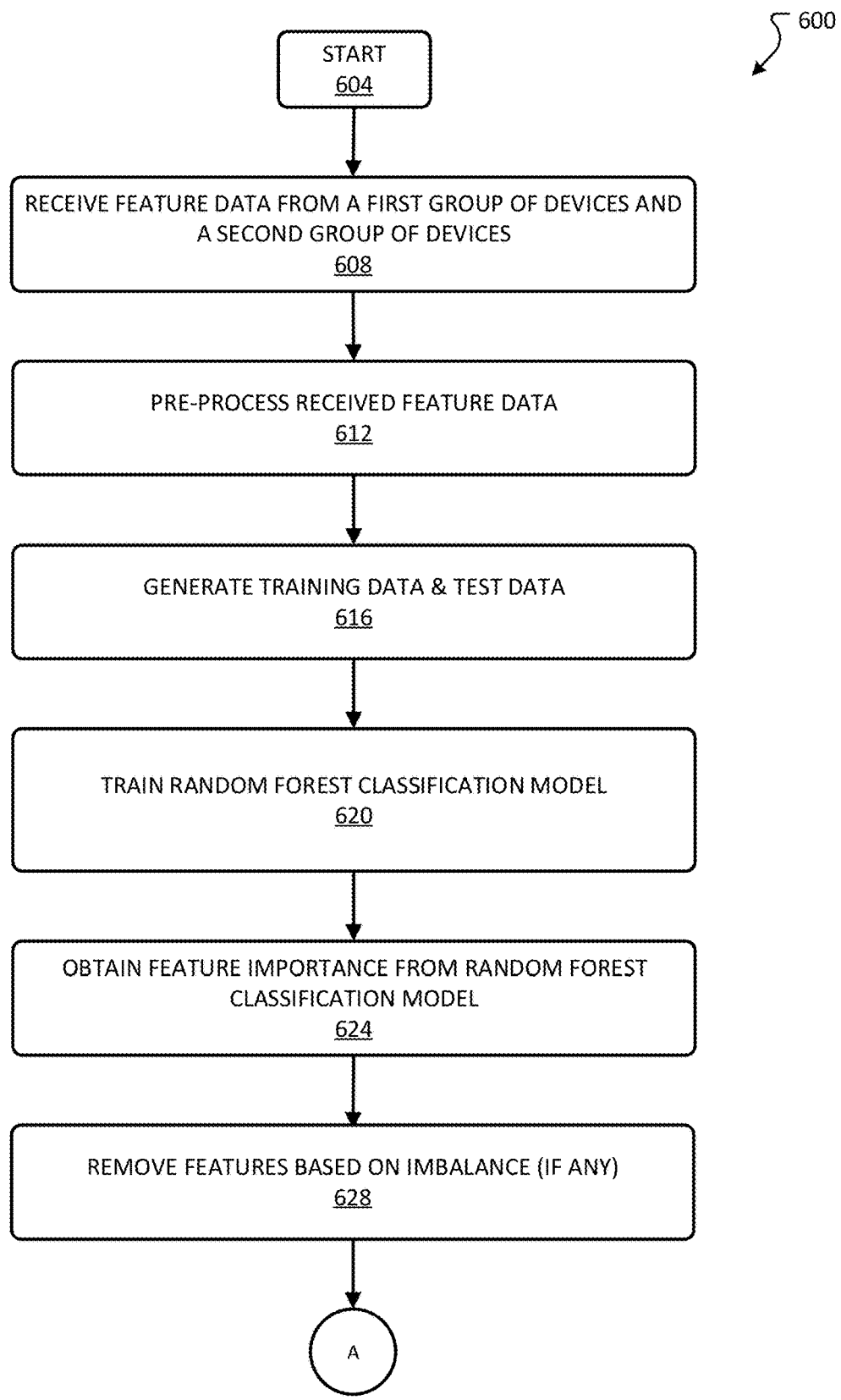
FIG. 6A depicts details of a method for generating a predicted quality metric for a group of devices and users based on an existing quality metric for a different group of devices and users in accordance with examples of the present disclosure.
Figure 6B:
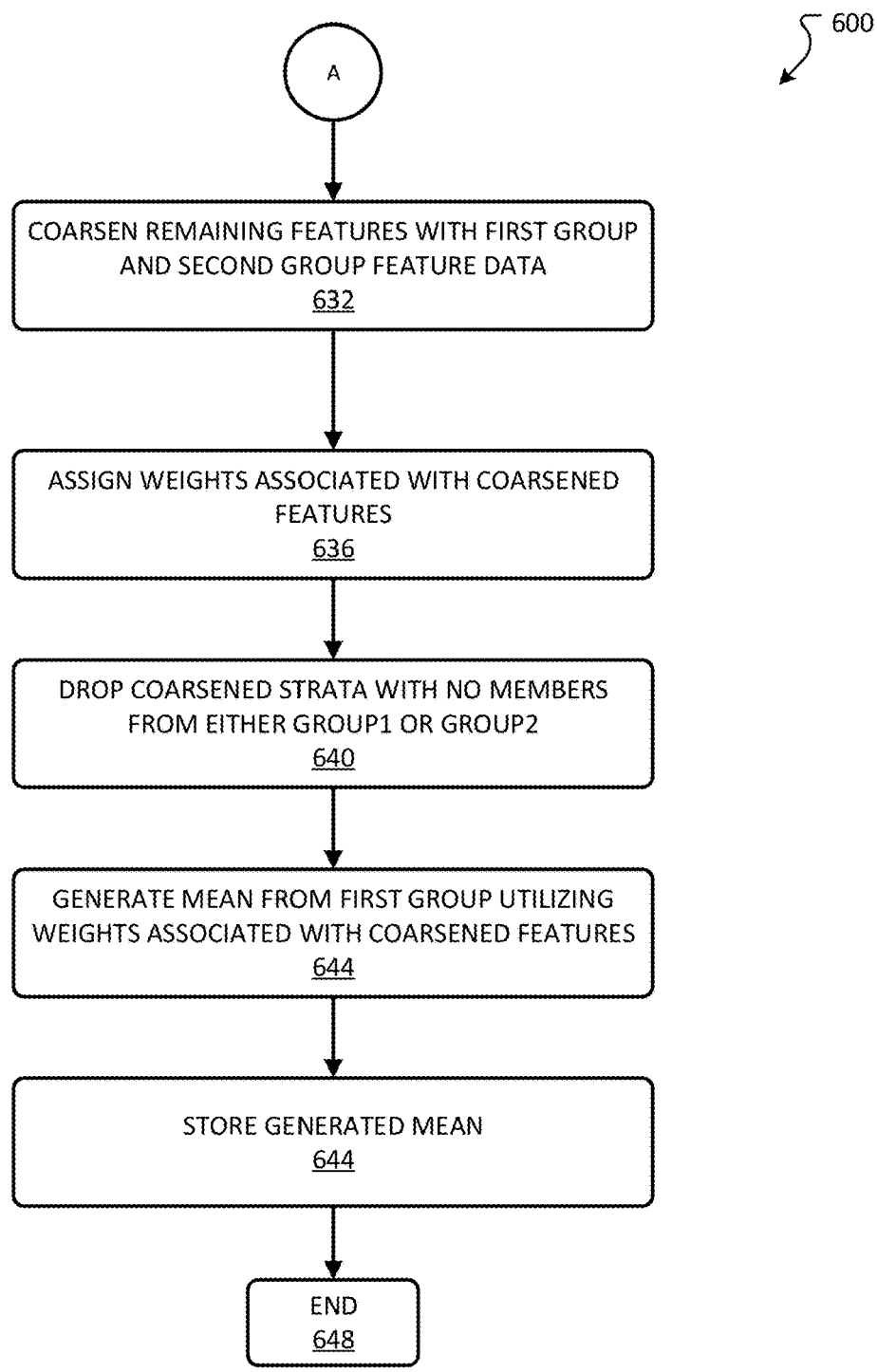
FIG. 6B depicts additional details of the method for generating a predicted quality metric for a group of devices and users based on an existing quality metric for a different group of devices and users in accordance with examples of the present disclosure.

FIGS. 6A-6B depict details of a method 600 for generating a predicted quality metric for a group of devices based on an existing quality metric for a different group of devices in accordance with examples of the present disclosure. A general order for the steps of the method 600 is shown in FIGS. 6A-6B. Generally, the method 600 starts at 604 and ends at 648. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5.

The method starts at 604, where flow may proceed to 608. At 608, feature data from a first group of devices and a second group of devices may be received. A first group of devices may be a limited number of devices associated with an preview program, beta program, or devices executing pre-release software or other software not yet available for retail or public use. A second group of devices may be retail devices running a released version of the software. As the first group of devices may be different from the larger second group of devices and/or may be used in a different manner from the larger second group of devices 108, a predicted quality metric indicating how well the pre-release version, or pre-release build, of the software would execute, or otherwise function, across the larger second group of devices may be generated. That is, utilizing similarities and differences between the first group of devices and the second group of devices, a quality metric for software expected to be executed at the second group of devices may be predicted based on a quality metric for software executing at the first group of devices. Accordingly, the feature data received at 608 may be specific to a quality metric and may be received from both first and second groups of devices. The quality metric may be associated with a specific functionality of the devices, software executing on the devices, and/or a service executing on the devices. For example, a quality metric may be equal to the mean time to failure (MTTF) for a service, such as a print spooler, install service, or window manager. As one non-limiting example, the quality metric may be the MTTF for a service or executable associated with graphics rendering. As another non-liming example, the quality metric may be a number of crashes associated with a print function for a word processing application, where such quality metric may be used to indicate a quality associated with an update to the operating system. The feature data received at 608 may be from the first group devices executing a pre-release version of a software, for example a pre-release version of an operating system or an update to the operating system. The feature data received at 608 may also be from the second group of devices executing a stable release of the operating system or stable release of the update to the operating system, where the stable release corresponds to a version of software that is released before the pre-release version of software.

At 612, the feature data received at 608 may be preprocessed to clean up the data; such cleanup may include removing null values and segmenting and categorizing data in some examples. Based on the preprocessed data, training and test data may be generated for training a random forest classification model, or other tree-based classification model at 616. For example, the pre-processed data may be provided in a format specific to a random forest classification model. A portion of the pre-processed data may be utilized to train the random forest classification model at 620, and once trained, the remaining portion of the pre-processed data may be utilized to predict feature data representing covariates having a high impact on the quality metric at 624. For example, the random forest classification model may score features representing covariates impacting the quality metric; each feature score may indicate the impact of the feature on the quality metric. Each of the features having a score above a threshold for example, may be selected as the features having a high impact on the quality metric. A subset of the identified covariates having a low impact on the quality metric may be removed based on feature imbalance at 628. Feature imbalance may be assessed such that features having a high impact on the quality metric and representing imbalance between the first group of devices and the second group of devices are utilized in a coarsened exact matching process. That is, imbalance may represent a level of difference that exists between the first group of devices and the second group of devices.

Moving to FIG. 6B, the features having a high impact on the quality metric and representing imbalance between the first group of devices and the second group of devices may be coarsened or stratified into smaller, more defined groups, or buckets, based on a predetermined set of criteria, where the predetermined set of criteria may correspond to a distribution, such as a Gaussian distribution and a number of strata, or buckets The features that exhibit imbalance may be selected and utilized in the coarsened exact matching process performed by a coarsened exact matching module. Coarsened exact matching is a causal inference technique to non-parametrically create a matched dataset to evaluate the effect of a treatment on a control population. In accordance with examples of the present disclosure, the feature data associated with the larger second group of devices may be considered to be the control population while the feature data associated with the smaller first group of devices may be considered to be the treatment population. Thus, the effect of the pre-release software for example, on the retail devices in the second group of devices, may be assessed utilizing coarsened exact matching. As previously described with respect to FIGS. 1-3, the coarsened exact matching process may generate weights associated with each of the coarsened features at 636 such that a quality metric derived on the basis of the first group of devices may be used to predict the quality metric for a second different group of devices based on similarities and differences that exist between the two groups of devices. In some examples, the coarsened exact matching process may generate groups having no matched members. For example, if a group of devices in the first group has a specific BIN sequence which is not found in the second group, the group of devices in the first group with the specific BIN sequence may be dropped from the weighing process at 640.

The method may proceed to 644 where a quality metric may be generated from the first group utilizing the weights associated with the coarsened features. For example, and as depicted in FIG. 3, a quality metric determined for each device may be weighted such that a weighted mean of the quality metric derived from the devices in the first group are indicative of the quality metric associated with the second group. Accordingly, at 644, the generated quality metric may be stored and/or provided to a dashboard for viewing by a client device. The method 600 may then end at 648.

Figure 7:
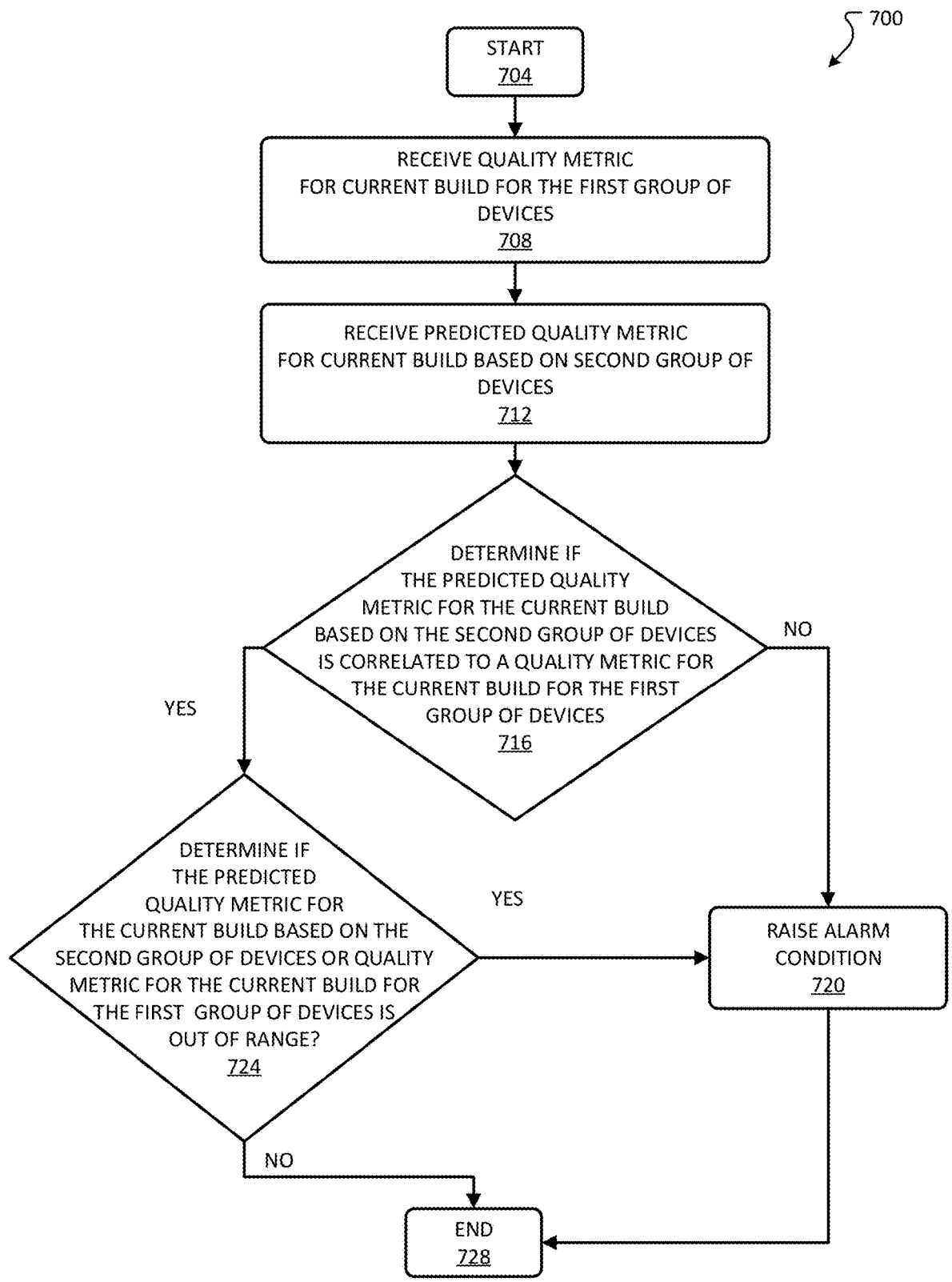
FIG. 7 depicts details of a method for determining if an action should be taken based on the quality metric for a first group of devices and users and a predicted quality metric for a second group of devices and users in accordance with examples of the present disclosure.

FIG. 7 depicts details of a method 700 for determining if an action should be taken based on the quality metric for a first group of devices and a predicted quality metric for a second group of devices in accordance with examples of the present disclosure. A general order for the steps of the method 700 is shown in FIG. 7. Generally, the method 700 starts at 704 and ends at 728. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, data structures, user interfaces, etc. described in conjunction with FIGS. 1-6.

The method starts at 704, where flow may proceed to 708. At 708, a quality metric for a current build associated with a first group of devices is received. For example, the quality metric may be the same as or similar to the quality metric 140 provided form the dashboard 136 and displayed at client device 144. At 712, a predicted quality metric for a current build based on a second group of devices is received. For example, the predicted quality metric may be the same as or similar to the predicted quality metric 180 provided form the dashboard 136 and displayed at client device 144. At 716, the method 700 may determine if the quality metric for the current build for the first group of devices is correlated to the predicted quality metric for the current build based on the second group of devices. In some examples, the two quality metrics may be correlated if a difference between the two is less than a threshold. If the two quality metrics are not correlated, the method 700 may proceed to 720 where an alarm condition may be raised. For example, a notification, such as a text message, email, or visual indication on a display may provide an indication to a user indicating that the two quality metrics are not correlated.

In some examples, and as depicted at 724, if the two quality metrics are correlated, the quality metric associated with the first group and/or the predicted quality metric associated with the second group may drop below a threshold or otherwise be out of range due to a bug, flaw, or other feature of the pre-release software. In such an instance, an alarm condition may be raised at 720. For example, a notification, such as a text message, email, or visual indication on a display may provide an indication to a user indicating that the two quality metrics are below a threshold. In some examples, if the quality metric for the current build for the first group of devices drops below a threshold but the predicted quality metric does not drop below the same or different threshold, such differences may be due in part to variances between the first and second groups of devices and a notification, such as a text message, email, or visual indication on a display may provide an indication of such. In some examples, the differences may be due in part to a bug having a noticeable effect on the second group of devices and not the first group of devices; alternatively, the differences may be due in part to a bug having a noticeable effect on the first group of devices and not the second group of devices. Accordingly, in instances where the quality metric or the predicted quality metric are out of range, a notification, such as a text message, email, or visual indication on a display may provide an indication to a user indicating as much. The method 700 may end at 728.

Figure 8:
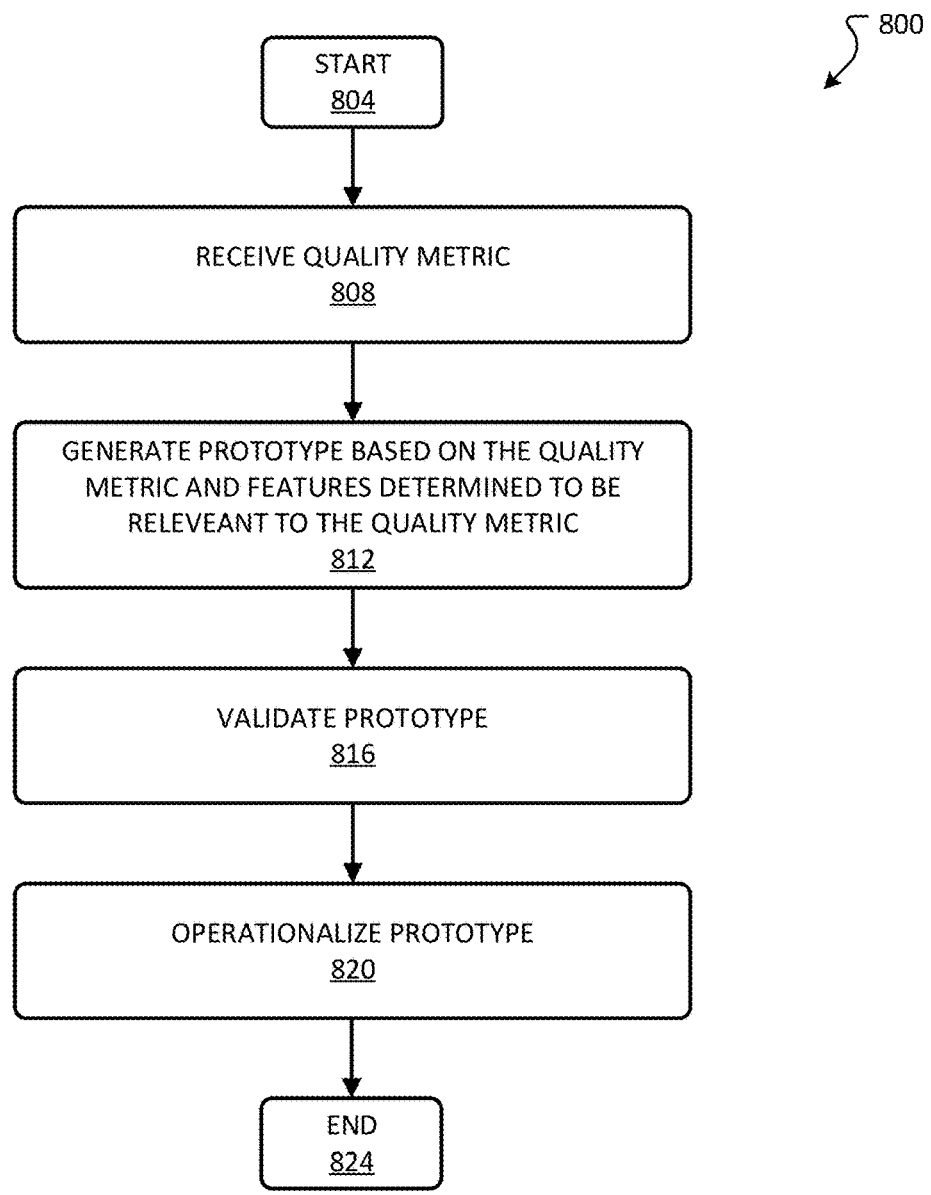
FIG. 8 depicts details of a method for generating a model that provides a predicted quality metric for a second group of devices and users based on a quality metric associated with a first group of devices and users in accordance with examples of the present disclosure.

FIG. 8 depicts details of a method 800 for generating a model that provides a predicted quality metric for a second group of devices based on a quality metric associated with a first group of devices in accordance with examples of the present disclosure. The first group of devices may correspond to the first group of devices 104 and the second group of devices may correspond to the second group of devices 108. A general order for the steps of the method 800 is shown in FIG. 8. Generally, the method 800 starts at 804 and ends at 824. The method 800 may include more or fewer steps or may arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, Application Specific Integrated Circuit (ASIC), a field programmable gate array (FPGA), a system on chip (SOC), or other hardware device. Hereinafter, the method 800 shall be explained with reference to the systems, components, modules, software, data structures, user interfaces, etc. described in conjunction with FIGS. 1-7.

The method starts at 804, where flow may proceed to 808. At 808, a quality metric associated with the first group of devices may be received. For example, the quality metric may be determined from empirical data and be based on a plurality of features received from telemetry information originating from a first group of devices. That is, the quality metric may be the same as or similar to the quality metric generated by the quality metric generator 132 depicted in FIG. 1. In some examples, the quality metric may be determined in consultation with engineers and scientists having knowledge specific to the software aspect being measured. For example, an engineer or scientist on a specific software development team may understand that a particular quality metric based on a plurality of features provides a successful indication of actual quality and user enjoyment. The method may proceed to 812, where a prototype model may be generated based on the quality metric and features identified and received at 808. For example, a prototype predicted quality metric generator 904 may be assembled based on the quality metric and the features identified and received at 808. At 816, the prototype may be validated by determining if the features identified and received at 808 provide a quality metric that matches an actual quality metric for the second group of devices. For example, a predicted quality metric may be generated for an earlier pre-release version of software that has now been released to the second group of devices. Accordingly, the predicted quality metric may be compared to an actual quality metric as part of the validation process. At 820, the method 800 may proceed to operationalize the prototype, whereby the prototype because operational and provides a predicted quality metric based on a quality metric associated with the pre-release software candidates. The method 800 may end at 824.

Figure 9:
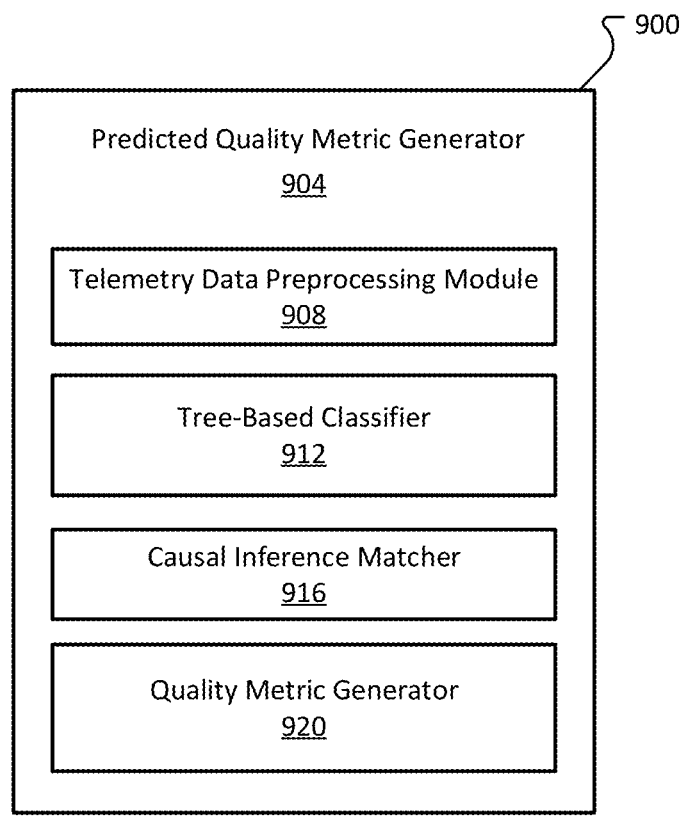
FIG. 9 depicts an example of a predicted quality metric generator in accordance with examples of the present disclosure.

FIG. 9 depicts a second example of the predicted quality metric generator 900 in accordance with examples of the present disclosure. The predicted quality metric generator 900 is similar to the predicted quality metric generator 160 of FIG. 1; however, the predicted quality metric generator 900 may utilize any tree-based classifier 912 to operate on pre-processed data provided by the telemetry data preprocessing module 908. That is, the predicted quality metric generator 160 utilized the random forest classification model 168; however, any tree based classifier may be used, such as a boosted trees for example. In addition, the predicted quality metric generator 160 utilized a coarsened exact matching model as a causal inference technique to create a matched dataset between two groups of devices. The predicted quality metric generator 900 may utilize any causal inference matcher, such as a propensity scoring matching model. Accordingly, the predicted quality metric from the quality metric generator 920 may be based on the tree-based classifier 912 and the causal inference matcher 916.

Figure 10:
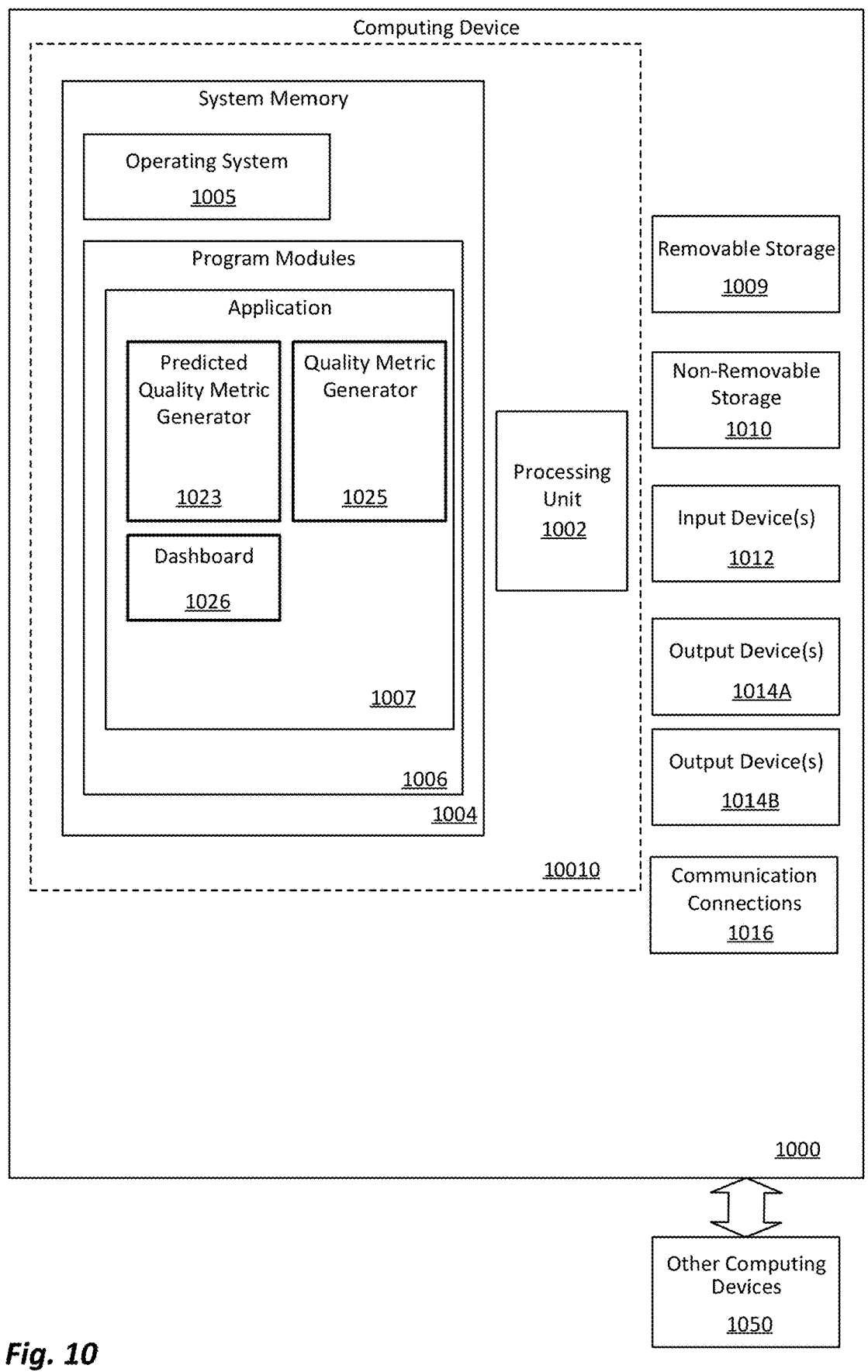
FIG. 10 depicts block diagram illustrating physical components (e.g., hardware) of a computing device with which aspects of the disclosure may be practiced.
Figure 11A:
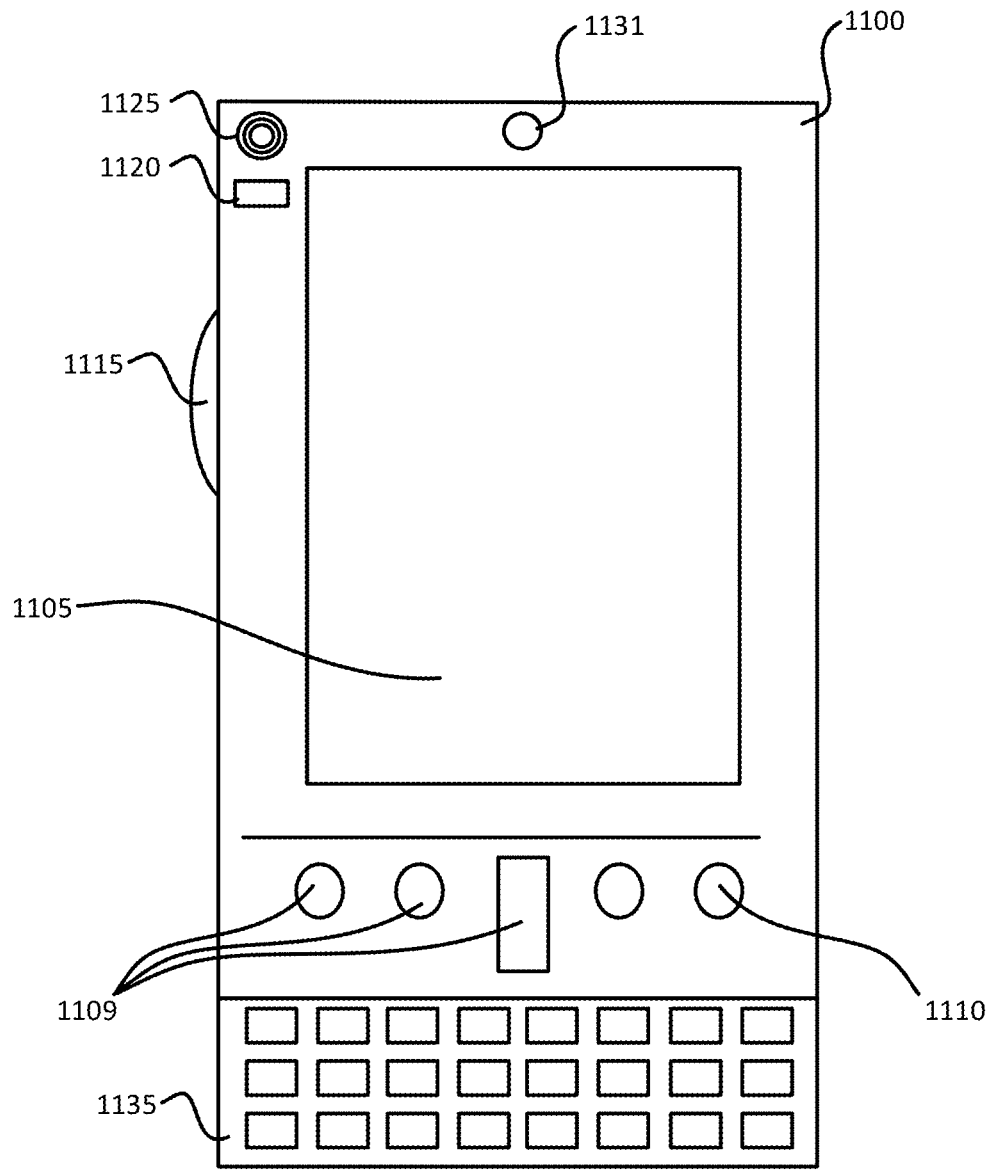
FIG. 11A illustrates a first example of a computing device with which aspects of the disclosure may be practiced.
Figure 11B:
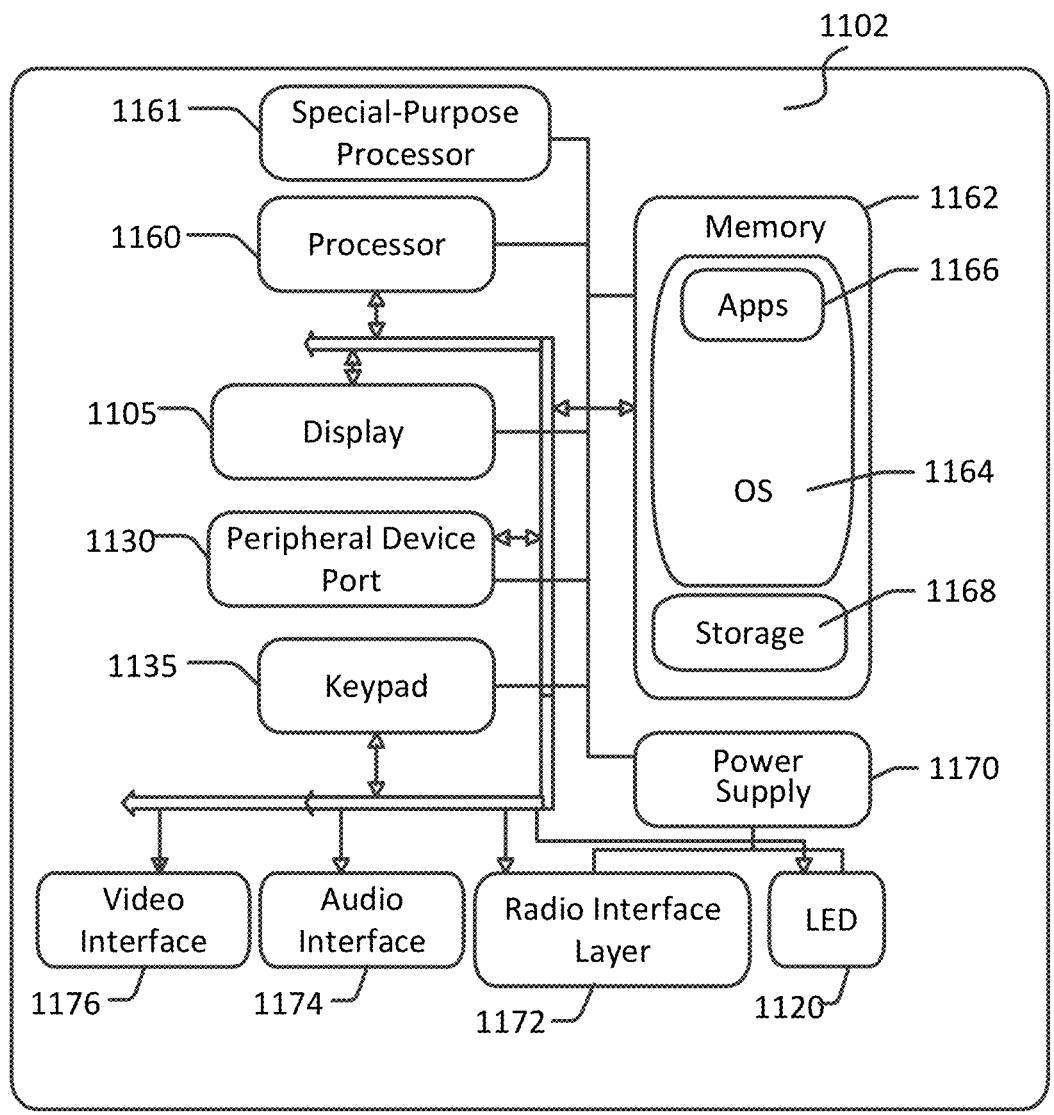
FIG. 11B illustrates a second example of a computing device with which aspects of the disclosure may be practiced.
Figure 12:
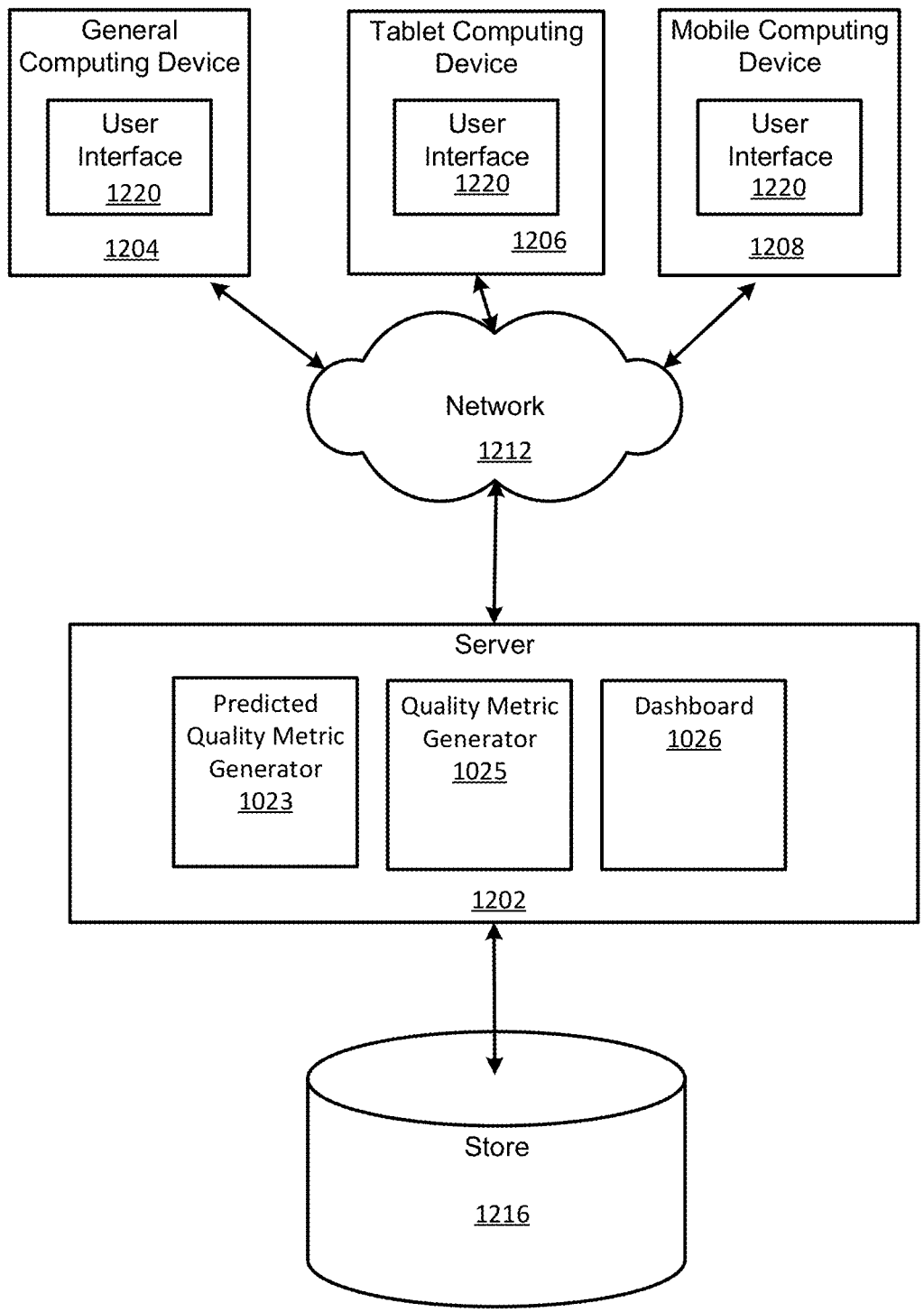
FIG. 12 illustrates at least one aspect of an architecture of a system for processing data in accordance with examples of the present disclosure.

FIGS. 10-12 and the associated descriptions provide a discussion of a variety of operating environments in which aspects of the disclosure may be practiced. However, the devices and systems illustrated and discussed with respect to FIGS. 10-12 are for purposes of example and illustration and are not limiting of a vast number of computing device configurations that may be utilized for practicing aspects of the disclosure, described herein.

FIG. 10 is a block diagram illustrating physical components (e.g., hardware) of a computing device 1000 with which aspects of the disclosure may be practiced. The computing device components described below may be suitable for the computing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software applications 1007, such as but not limited to a predicted quality metric generator 1023, a quality metric generator 1025, and a dashboard 1026, and/or one or more components supported by the systems described herein. The predicted quality metric generator 1023 may be same as or similar to the predicted quality metric generator 1060; the quality metric generator 1025 may be the same as or similar to the quality metric generator 132, and the dashboard 1026 may be same as or similar to the dashboard 136 as described with respect to, but not limited to, at least FIGS. 1-9 of the present disclosure. The operating system 1005, for example, may be suitable for controlling the operation of the computing device 1000.

Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 804. While executing on the at least one processing unit 802, the program modules 806 may perform processes including, but not limited to, one or more aspects, as described herein. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014A such as a display, speakers, a printer, etc. may also be included. An output 1014B, corresponding to a virtual display may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 11A and 11B illustrate a computing device or mobile computing device 1100, for example, a mobile telephone, a smart phone, wearable computer (such as a smart watch), a tablet computer, a laptop computer, and the like, with which aspects of the disclosure may be practiced. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some aspects. In yet another alternative aspect, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various aspects, the output elements include the display 1105 for showing a graphical user interface (GUI), a visual indicator 1131 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external source.

FIG. 11B is a block diagram illustrating the architecture of one aspect of computing device, a server, or a mobile computing device. That is, the computing device 1100 can incorporate a system (e.g., an architecture) 1102 to implement some aspects. The system 902 can implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and/or one or more components supported by the systems described herein. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g. a predicted quality metric generator 1023, a quality metric generator 1025, and a dashboard 1026, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 972 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated configuration, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

FIG. 12 illustrates one aspect of the architecture of a system for processing data received at a computing system from a remote source, such as a personal computer 1204, tablet computing device 1206, or mobile computing device

1208, as described above. Content displayed at server device 1202 may be stored in different communication channels or other storage types.

In some aspects, one or more of a predicted quality metric generator 1023, a quality metric generator 1025, and a dashboard 1026 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these embodiments of the computing devices may obtain content from the store 1216, in addition to receiving graphical data usable to be either pre-processed at a graphic-originating system, or post-processed at a receiving computing system.

FIG. 12 illustrates an exemplary mobile computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infrared data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

In accordance with examples of the present disclosure, a method for generating a predicted quality metric is provided. The method may include receiving first telemetry data from a first group of devices executing first software, generating a quality metric for the first software based on the first telemetry data, receiving second telemetry data from a second group of devices, wherein the second group of devices is different from the first group of devices, identifying covariates impacting the quality metric based on features included in the first telemetry data and the second telemetry data, and performing coarsened exact matching utilizing the identified covariates to generate a predicted quality metric for the first software on the second group of devices.

At least one aspect of the above method may include utilizing a tree-based classifier to identify the covariates impacting the quality metric based on features included in the first telemetry data and the second telemetry data. At least one aspect of the above method may include where the tree-based classifier is a random forest classifier. At least one aspect of the above method may include training the tree-based classifier with a portion of the feature data from the first telemetry data and the second telemetry data. At least one aspect of the above method may include performing the coarsened exact matching using a subset of the identified covariates that are greater than a threshold. At least one aspect of the above method may include causing the quality metric for the first software to be displayed at a display device in proximity to the predicted quality metric for the first software on the second group of devices. At least one aspect of the above method may include generating an alarm condition when at least one of the quality metric for the first software or the predicted quality metric for the first software is less than a threshold. At least one aspect of the above method may include where the quality metric is a mean time to failure metric for a service executing on the first group of devices. At least one aspect of the above method may include receiving third telemetry data from the second group of devices executing second software, generating a second quality metric for the second software based on the third telemetry data, and providing a prediction error based on a difference between the second quality metric for the second software and the predicted quality metric for the first software.

In accordance with examples of the present disclosure, a computer-readable media is provided. The computer-readable media may include instructions, which when executed by a processor, causes the processor to: receive first telemetry data from a first group of devices executing first software, generate a quality metric for the first software based on the first telemetry data, receive second telemetry data from a second group of devices, wherein the second group of devices is different than the first group of devices, identify covariates impacting the quality metric based on features included in the first telemetry data and the second telemetry data, perform coarsened exact matching utilizing the identified covariates, identify weights to be assigned to each device in the first group of devices, and generate a predicted quality metric based on the weights assigned to each device in the first group of devices and the identified covariates.

At least one aspect of the above computer-readable media may include instructions, which when executed by the processor, cause the processor to utilize a tree-based classifier to identify the covariates impacting the quality metric based on features included in the first telemetry data and the second telemetry data. At least one aspect of the above computer-readable media may include where the tree-based classifier is a random forest classifier. At least one aspect of the above computer-readable media may include instructions, which when executed by the processor, cause the processor to train the tree-based classifier with a portion of the feature data from the first telemetry data and the second telemetry data. At least one aspect of the above computer-readable media may include instructions, which when executed by the processor, cause the processor to perform the coarsened exact matching processing using a subset of the identified covariates that are greater than a threshold. At least one aspect of the above computer-readable media may include instructions, which when executed by the processor, cause the processor to cause the quality metric to be displayed at a display device in proximity to the predicted quality metric. At least one aspect of the above computer-readable media may include instructions, which when executed by the processor, cause the processor to generate an alarm condition when at least one of the quality metric or the predicted quality metric is less than a threshold.

In accordance with examples of the present disclosure, a system for generating a predicted quality metric is provided. The system may include a processor, and memory storing instructions, which when executed by the processor, cause the processor to: receive first telemetry data from each device in a first group of devices executing first software, generate a quality metric for the first software based on the first telemetry data, receive second telemetry data from a second group of devices, wherein the second group of devices is different than the first group of devices, identify covariates impacting the quality metric based on features included in the first telemetry data and the second telemetry data, stratify the first and second group of devices based on the identified covariates, reweight each device in the first group of devices, and generate a predicted quality metric based on the weights assigned to each device in the first group of devices and the identified covariates.

At least one aspect of the above system may include where the instructions cause the processor to utilize a tree-based classifier to identify the covariates impacting the quality metric based on features included in the first telemetry data and the second telemetry data. At least one aspect of the above system may include where the instructions cause the processor to stratify the first and second group of devices using a subset of the identified covariates that are greater than a threshold. At least one aspect of the above system may include where the instructions cause the processor to provide the quality metric to a display device in proximity to the predicted quality metric.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A method for generating a predicted quality metric for a software, the method comprising:
    receiving, by a computing device, first telemetry data from a first group of devices executing a first software;
    generating, by the computing device, a quality metric for the first software based on the first telemetry data;
    receiving, by the computing device, second telemetry data from a second group of devices executing the first software, wherein the second group of devices is different than the first group of devices;
    generating, by the computing device, a first predicted quality metric for the first software based on the first telemetry data and the second telemetry data including:
        identifying, by the computing device, one or more covariates impacting the quality metric for the first software based on features included in the first telemetry data and the second telemetry data; and
    generating, by the computing device, a notification when at least one of the quality metric for the first software or the first predicted quality metric for the first software is less than a threshold.

2. The method of claim 1, wherein generating the first predicted quality metric for the first software further comprises performing causal inference matching.

3. The method of claim 2, wherein performing the causal inference matching further comprises performing propensity scoring matching.

4. The method of claim 2, wherein performing the causal inference matching further comprises performing coarsened exact matching utilizing the identified one or more covariates to generate the first predicted quality metric for the first software on the second group of devices.

5. The method of claim 4, further comprising performing the coarsened exact matching using a subset of the identified one or more covariates that are greater than a threshold.

6. The method of claim 1, further comprising utilizing a tree-based classifier to identify the one or more covariates impacting the quality metric for the first software based on the features included in the first telemetry data and the second telemetry data.

7. The method of claim 1, wherein the notification further comprises an alarm condition, a text message, an email, or a visual indication on a display.

8. The method of claim 1, wherein the quality metric for the first software is a mean time to failure metric for a service executing on the first group of devices.

9. The method of claim 1, further comprising:
    receiving third telemetry data from the second group of devices executing a second software;
    generating a second predicted quality metric for the second software based on the third telemetry data; and
    providing a prediction error based on a difference between the second predicted quality metric for the second software and the first predicted quality metric for the first software.

10. A computer storage medium storing instructions, which when executed by a processor, cause the processor to:
    receive first telemetry data from a first group of devices executing a first software;
    generate a quality metric for the first software based on the first telemetry data;
    receive second telemetry data from a second group of devices executing the first software, wherein the second group of devices is different than the first group of devices;
    generate a first predicted quality metric for the first software based on the first telemetry data and the second telemetry data including:
        identify one or more covariates impacting the quality metric for the first software based on features included in the first telemetry data and the second telemetry data; and
    generate a notification when at least one of the quality metric for the first software or the first predicted quality metric for the first software is less than a threshold.

11. The computer storage medium of claim 10, wherein generate the first predicted quality metric for the first software further comprises perform causal inference matching.

12. The computer storage medium of claim 11, wherein perform the causal inference matching further comprises perform propensity scoring matching.

13. The computer storage medium of claim 11, wherein perform the causal inference matching further comprises perform coarsened exact matching utilizing the identified one or more covariates to generate the first predicted quality metric for the first software on the second group of devices.

14. The computer storage medium of claim 13, wherein the instructions further cause the processor to perform the coarsened exact matching using a subset of the identified one or more covariates that are greater than a threshold.

15. The computer storage medium of claim 10, wherein the instructions further cause the processor to utilize a tree-based classifier to identify the one or more covariates impacting the quality metric for the first software based on the features included in the first telemetry data and the second telemetry data.

16. The computer storage medium of claim 10, wherein the notification further comprises an alarm condition, a text message, an email, or a visual indication on a display.

17. A system for generating a predicted quality metric for a software, the system comprising:
 a processor; and
 a memory storing instructions, which when executed by the processor, cause the processor to:
  receive first telemetry data from a first group of devices executing a first software;
  generate a quality metric for the first software based on the first telemetry data;
  receive second telemetry data from a second group of devices executing the first software, wherein the second group of devices is different than the first group of devices;
  identify one or more covariates impacting the quality metric for the first software based on features included in the first telemetry data and the second telemetry data;
  generate a first predicted quality metric for the first software based on the first telemetry data and the second telemetry data; and
  generate a notification when at least one of the quality metric for the first software or the first predicted quality metric for the first software is less than a threshold.

18. The system of claim 17, wherein generate the first predicted quality metric for the first software further comprises perform causal inference matching.

19. The system of claim 18, wherein perform the causal inference matching further comprises perform propensity scoring matching.

20. The system of claim 18, wherein perform the causal inference matching further comprises:
 stratify the first group of devices and the second group of devices based on the identified one or more covariates;
 assign a weight to each device in the first group of devices based on the stratified first group of devices and second group of devices; and
 generate the first predicted quality metric for the first software based on the weight assigned to each device in the first group of devices and the identified one or more covariates.

\* \* \* \* \*